(12) United States Patent
Komori et al.

(10) Patent No.: US 8,919,296 B2
(45) Date of Patent: Dec. 30, 2014

(54) HOT-WATER SUPPLY SYSTEM

(75) Inventors: Kou Komori, Nara (JP); Yuichi Yakumaru, Osaka (JP); Atsushi Kakimoto, Hyogo (JP); Tomoichiro Tamura, Osaka (JP)

(73) Assignee: Panasonic Corporation, Osaka (JP)

( * ) Notice: Subject to any disclaimer, the term of this patent is extended or adjusted under 35 U.S.C. 154(b) by 1009 days.

(21) Appl. No.: 12/740,759

(22) PCT Filed: Oct. 29, 2008

(86) PCT No.: PCT/JP2008/003098
§ 371 (c)(1),
(2), (4) Date: Apr. 30, 2010

(87) PCT Pub. No.: WO2009/057303
PCT Pub. Date: May 7, 2009

(65) Prior Publication Data
US 2010/0236498 A1    Sep. 23, 2010

(30) Foreign Application Priority Data
Nov. 2, 2007    (JP) ................................. 2007-285944

(51) Int. Cl.
| F24H 1/50 | (2006.01) |
| F24D 3/08 | (2006.01) |
| F24D 11/02 | (2006.01) |
| F28D 20/00 | (2006.01) |

(52) U.S. Cl.
CPC ............ *F24D 11/0228* (2013.01); *F24D 3/082* (2013.01); *Y02B 30/126* (2013.01); *F28D 2020/0082* (2013.01); *F28D 2020/0078* (2013.01); *Y02B 10/70* (2013.01)
USPC .......... 122/19.1; 122/13.3; 122/18.1; 122/32; 237/59; 237/62

(58) Field of Classification Search
CPC ..................................... F24H 1/48; F24H 1/50
USPC ............ 122/19.1, 18.1, 13.3, 32; 237/59, 62, 237/19; 210/149; 165/132, 154, 169
See application file for complete search history.

(56) References Cited

U.S. PATENT DOCUMENTS

| 1,254,519 | A | * | 1/1918 | McClellan | ....................... 62/192 |
| 2,889,139 | A | * | 6/1959 | Hedberg | ........................ 165/132 |

(Continued)

FOREIGN PATENT DOCUMENTS

| DE | 20 2005 017 583 | 3/2007 |
| FR | 2 856 469 | 12/2004 |

(Continued)

*Primary Examiner* — Kang Hu
*Assistant Examiner* — John Bargero
(74) *Attorney, Agent, or Firm* — Hamre, Schumann, Mueller & Larson, P.C.

(57) ABSTRACT

A hot water supply system includes a first tank for storing hot water for heating; a second tank for storing hot water to be supplied to a hot water tap; a heater circulation path for supplying the hot water of the first tank to a heater; a first path that includes a first heat transfer portion surrounding the exposed portion of the second tank to the inside of the first tank and that connects the first tank to a forward portion of the heater circulation path so that the hot water of the first tank can be supplied to the heater through the first heat transfer portion; and a second path that includes a second heat transfer portion disposed along the first heat transfer portion, and that allows heat exchange between the hot water of the second tank and the hot water flowing through the first heat transfer portion due to the flow, in the second heat transfer portion, of the hot water of the second tank.

13 Claims, 11 Drawing Sheets

(56) References Cited

U.S. PATENT DOCUMENTS

| | | | | |
|---|---|---|---|---|
| 3,237,608 | A * | 3/1966 | Brandl | 122/33 |
| 3,256,991 | A * | 6/1966 | Kamrud | 122/13.3 |
| 4,217,765 | A * | 8/1980 | Ecker | 62/503 |
| 4,469,935 | A * | 9/1984 | Candela | 392/456 |
| 4,632,180 | A * | 12/1986 | Lauderdale | 165/70 |
| 4,852,366 | A * | 8/1989 | Harris | 62/238.6 |
| 5,727,396 | A * | 3/1998 | Boyd et al. | 62/323.1 |
| 5,838,879 | A * | 11/1998 | Harris | 392/451 |
| 5,946,927 | A * | 9/1999 | Dieckmann et al. | 62/238.6 |
| 6,298,687 | B1 | 10/2001 | Dienhart et al. | |
| 2005/0167516 | A1 * | 8/2005 | Saitoh et al. | 237/2 B |
| 2006/0011149 | A1 | 1/2006 | Stevens | |
| 2006/0213209 | A1 * | 9/2006 | Tanaami et al. | 62/238.6 |

FOREIGN PATENT DOCUMENTS

| | | |
|---|---|---|
| JP | 2-067843 U | 5/1990 |
| JP | 2000-028200 A | 1/2000 |
| JP | 2000-227289 A | 8/2000 |
| JP | 2003-207209 A | 7/2003 |
| JP | 2003-274711 A | 9/2003 |
| JP | 2004-183934 A | 7/2004 |
| JP | 2005-315480 A | 11/2005 |
| JP | 2006-521528 A | 9/2006 |

\* cited by examiner

HOT-WATER SUPPLY SYSTEM

TECHNICAL FIELD

The present invention relates to a hot-water supply system. Particularly, it relates to a heating/hot-water supply system capable of performing heating by hot water stored in a hot water storage tank.

BACKGROUND ART

A storage type hot-water supply system having a heating function and a hot-water supply function is conventionally known. For example, JP 2004-183934 A describes a storage type hot-water supply system provided with a tank for storing hot water for hot-water supply, and a pipe for heating and a pipe for hot-water supply that are wound around the outer peripheral surface of the tank in contact with each other. A heat medium (generally water) for heating is heated by the heat exchange between the heat medium flowing through the pipe for heating and hot water flowing through the pipe for hot-water supply. Indoor heating can be performed using the heated heat medium. Basically, a heat pump is used only for boiling water for hot-water supply.

On the other hand, for example in Europe, a storage type hot-water supply system with a configuration indicated in FIG. 11 is widely used. The storage type hot-water supply system indicated in FIG. 11 is provided with a first tank 300 for storing hot water for heating, a second tank 302 for storing hot water for hot-water supply, and a heater 308 disposed inside the first tank 300. The second tank 302 is mounted to the first tank 300 with a part thereof being exposed to the inside of the first tank 300. The water of the second tank 302 is heated by the heat exchange between the hot water of the first tank 300 and the water of the second tank 302. The hot water of the second tank 302 is supplied to a hot-water tap 304, and the hot water of the first tank 300 is supplied to a radiator 306 for heating.

According to the system indicated in FIG. 11, the hot water of the first tank 300 can be supplied directly to the radiator 306 in a large amount. It is therefore easier to deal with a heavy heating load, compared to the system of JP 2004-183934 A having only one tank. Although the volume of the second tank 302 is less than that of the first tank 300, in the region where people are not accustomed to using a large amount of hot water in a short time, such as filling the bathtub with hot water, there is little problem of lack of hot water even with such a configuration. In recent years, a heat pump began to be employed instead of the heater 308 for improving energy consumption efficiency.

However, the system indicated FIG. 11 still has a problem in that, in cold areas where the variation of the load and the amount of the load are significant, a load exceeding the heating performance of the heater or the heat pump may occur, so that a sufficient heating effect cannot be achieved. Such a problem particularly is likely to occur in a time period in which rapid heating is required (for example, in the morning and evening).

As a countermeasure to such a sudden load increase, the volume of the tank for storing hot water for heating is increased, the set temperature of the hot water to be stored in the tank is adjusted (water temperature is set higher), the heating performance of the heat pump is improved, and an auxiliary heater is used, for example. However, the increase in the volume of the tank causes an increase in the amount of the heat radiation from the tank to the outside, so that the energy consumption efficiency is decreased. There also is a limit in setting the temperature of the hot water to be stored in the tank higher. The improvement of the heating performance of the heat pump involves an inevitable rise in the cost. Although an auxiliary heater is preferably provided in view of enhancing the maximum heating performance of the system, the more the system is dependent on the auxiliary heater, the more the advantages of the heat pump having an excellent energy consumption efficiency are reduced.

In view of such circumstances, it is an object of the present invention to provide a hot-water supply system that is comparable to conventional systems in the energy consumption efficiency and cost and is also capable of dealing with a sudden load increase.

DISCLOSURE OF THE INVENTION

That is, the present invention provides a hot-water supply system including: a first tank that stores hot water for heating; a second tank that is accommodated in or mounted to the first tank with at least a part thereof exposed to the inside of the first tank and that stores hot water to be supplied to a hot-water tap; a heater circulation path for supplying the hot water of the first tank to a heater and returning the hot water from the heater to the first tank; a first path that includes a first heat transfer portion surrounding the exposed portion of the second tank to the inside of the first tank and that connects (relays) the first tank to a forward portion of the heater circulation path so that the hot water of the first tank can be supplied to the heater through the first heat transfer portion; and a second path that includes a second heat transfer portion disposed along the first heat transfer portion and that is configured to allow heat exchange between the hot water of the second tank and the hot water flowing through the first heat transfer portion due to the flow of the hot water of the second tank in the second heat transfer portion.

The above-mentioned hot-water supply system of the present invention is provided with the first path and the second path, which enhances the heat exchange between the hot water of the first tank flowing through the first heat transfer portion and the hot water of the second tank flowing through the second heat transfer portion. Accordingly, in the case where a high heating performance exceeding the heating performance of the heater or the heat pump is required, while the hot water of the second tank is circulated in the second path, the hot water of the first tank is introduced into the heater circulation path through the first path. As a result, auxiliary heating of the hot water of the first tank to be supplied to the heater can be performed efficiently using the hot water of the second tank. In other words, an effective use of the hot water stored in the second tank for hot-water supply as an auxiliary heat source makes it possible temporarily to raise the general level of the heating performance of the hot-water supply system. Accordingly, the hot-water supply system of the present invention is comparable to conventional systems in view of the energy consumption efficiency and cost, as well as being capable of dealing with a sudden load increase.

Meanwhile, even in the conventional hot-water supply system (refer to FIG. 11) provided without the first path and the second path as well as not having the first heat transfer portion and the second heat transfer portion, heat exchange occurs between the hot water of the first tank 300 and the hot water of the second tank 302 because the second tank 302 is immersed in the hot water of the first tank 300. However, the heat exchange is slow compared to the case of the present invention, because nothing is devised for enhancing the heat exchange. Therefore, it is impossible to use the hot water of the second tank 302 effectively as an auxiliary heat source, thus failing to raise the general level of the heating performance of the system by the hot water of the second tank 302.

BEST MODE FOR CARRYING OUT THE INVENTION

Hereinafter, embodiments of the present invention are described with reference to the drawings.

Figure 1:
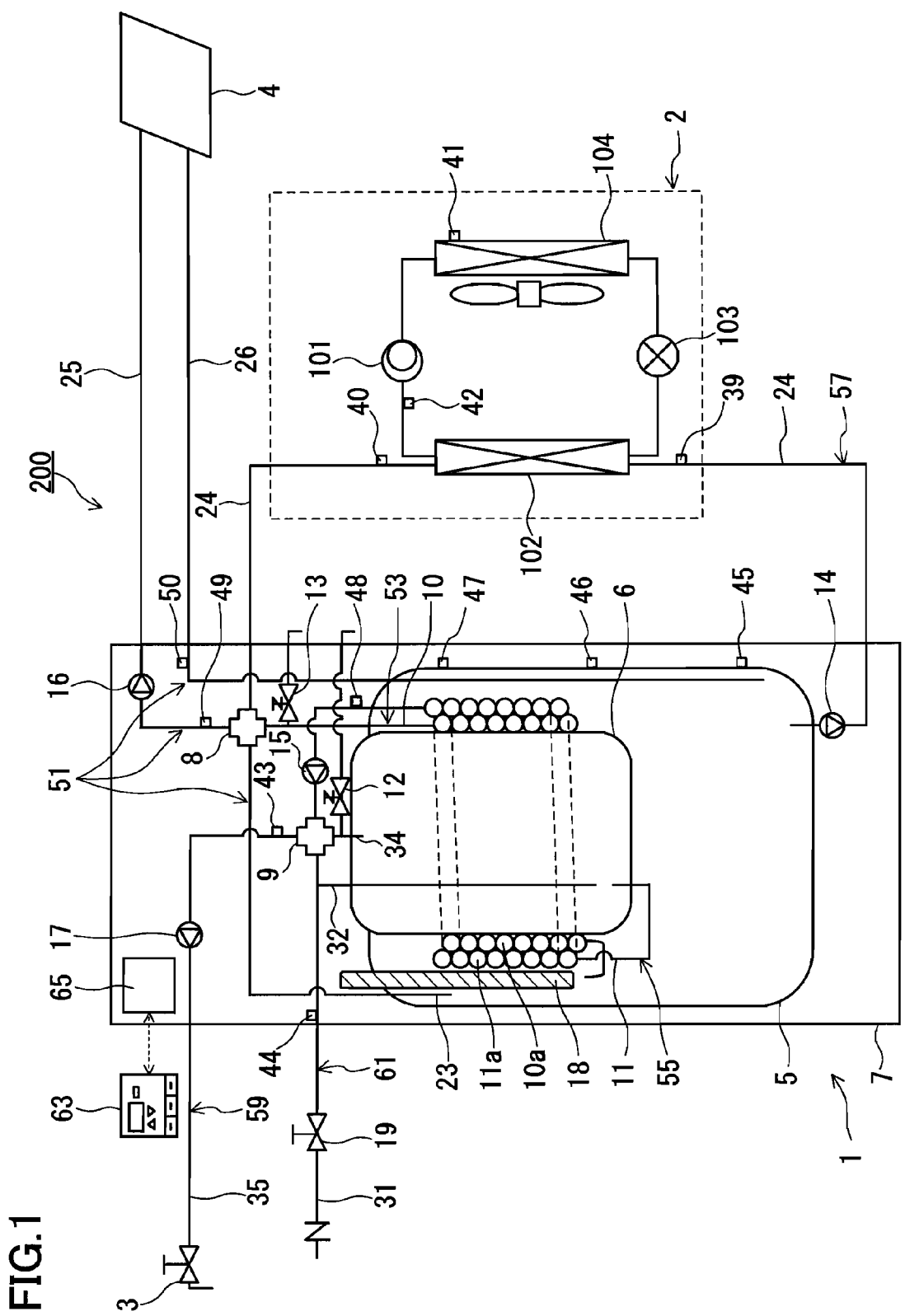
FIG. 1 is a schematic diagram indicating a hot-water supply system according to one embodiment of the present invention.

FIG. 1 is a schematic diagram indicating a hot-water supply system according to one embodiment of the present invention. A hot-water supply system 200 is provided with a hot-water supply tank unit 1 and a heat pump 2 (heat pump unit). Water heated by the heat pump 2 is stored in a first tank 5 of the hot-water supply tank unit 1. The hot water stored in the first tank 5 is circulated in a heater 4. Hot water of a second tank 6 that has been heated indirectly by the hot water stored in the first tank 5 is supplied to a hot-water tap 3. The heater 4 is constituted by a water heating equipment such as a radiator and a floor heater.

In this regard, the heater 4 may be constituted also by a heat exchanger for use in reheating bath water or the like. That is, the term "heating" herein is not limited to "indoor heating". The heater 4 may be any device capable of transferring the heat of the hot water of the first tank 5 to an object such as water and air.

The heat pump 2 is a means for heating the hot water of the first tank 5 and is provided with a compressor 101, a water-refrigerant heat exchanger 102 serving as a condenser or gas cooler, an electric expansion valve 103 serving as an expansion mechanism, and an evaporator 104. A refrigerant circuit is formed by the compressor 101, the water-refrigerant heat exchanger 102, the electric expansion valve 103 and the evaporator 104 that are connected by refrigerant pipes in this order. The refrigerant circuit of the heat pump 2 is filled with refrigerant such as carbon dioxide or hydrofluorocarbon. In the case where carbon dioxide is used as refrigerant, the refrigerant is brought to the supercritical state in the water-refrigerant heat exchanger 102. The heat pump 2 makes it possible to heat water to a high temperature of about 90° C. A positive displacement type expander also may be employed instead of the electric expansion valve 103 so that the expansion energy of the refrigerant can be recovered.

The hot-water supply tank unit 1 is provided with the first tank 5 storing hot water for heating, the second tank 6 for storing hot water to be supplied to the hot-water tap 3, and a housing 7 accommodating them. The volume of the first tank 5 is larger than the volume of the second tank 6. The second tank 6 is mounted to the first tank 5 with its upper part projecting from the first tank 5 and the remainder being exposed to the inside of the first tank 5. The first tank 5 and the second tank 6 form a double tank structure. The hot water of the second tank 6 is heat-insulated and/or heated by the hot water of the first tank 5. Although the entire second tank 6 may be accommodated in the first tank 5, the upper part of the second tank 6 may project from the upper part of the first tank 5, as is the case of this embodiment. According to this configuration, the work of connecting various pipes to the second tank 6 is easy, which can reduce the production cost.

Basically, the hot water of the first tank 5 and the hot water of the second tank 6 are not to be mixed. The hot water of the second tank 6 only is to be supplied to the hot-water tap 3. The hot water of the first tank 5 only is to be heated directly by the heat pump 2. The hot water of the second tank 6 is heated indirectly by the hot water stored in a space in the upper part of the first tank 5. Therefore, even in a region where the city water is hard water, scale accumulation in the water-refrigerant heat exchanger 102 is unlikely to occur and thus the heat exchange efficiency is unlikely to decrease with time. The hot water of the first tank 5 may include brine.

The components inside the housing 7 such as tanks and pipes are covered with a heat insulator (for example, heat resistant polystyrene foam), so that heat radiation is reduced.

The bottom surface of the second tank 6 mounted to the first tank 5 is located around the middle of the first tank 5 in height. The space in the upper part of the first tank 5 is annulus, and is defined by the sidewall of the first tank 5 and the sidewall of the second tank 6. The volume occupied by this space is small with respect to the volume of the first tank 5, which is, for example, less than half the volume of the first tank 5. A setting in which hot water at high temperature is stored only in the cylindrical space during a season when the load is low, for example in summer, makes it possible to suppress heat radiation from the external surface of the first tank 5 to a minimum as well as maintaining the hot water of the second tank 6 at high temperature. Further, an auxiliary heater 18 is disposed in this cylindrical space. In the case where particularly high heating performance is necessary, it also is possible to heat the hot water of the first tank 5 using this auxiliary heater 18.

Thermal stratification is formed in the hot water of the first tank 5 from the upper part to the bottom. Specifically, the temperature of the hot water of the first tank 5 is, although it depends on the situation or the season of use of the system, 50 to 90° C. in the upper part (periphery of the second tank 6), and 30 to 50° C. at the bottom. The temperature of the hot water of the second tank 6 is 60 to 80° C. unless a large amount of hot water is drawn from the hot-water tap 3 in a short time, because the second tank 6 is heated and/or heat-insulated by the hot water stored in space the upper part of the first tank 5.

The hot-water supply tank unit 1 further is provided with a heater circulation path 51, a first path 53, a second path 55, a heat pump path 57, a hot-water supply path 59 and a water supply path 61. The forward portion of the heater circulation path 51, the first path 53 and heat pump path 57 are connected to each other via a first valve mechanism 8. Similarly, the second path 55, the hot-water supply path 59 and the water supply path 61 are connected to each other via a second valve mechanism 9.

Figure 7:
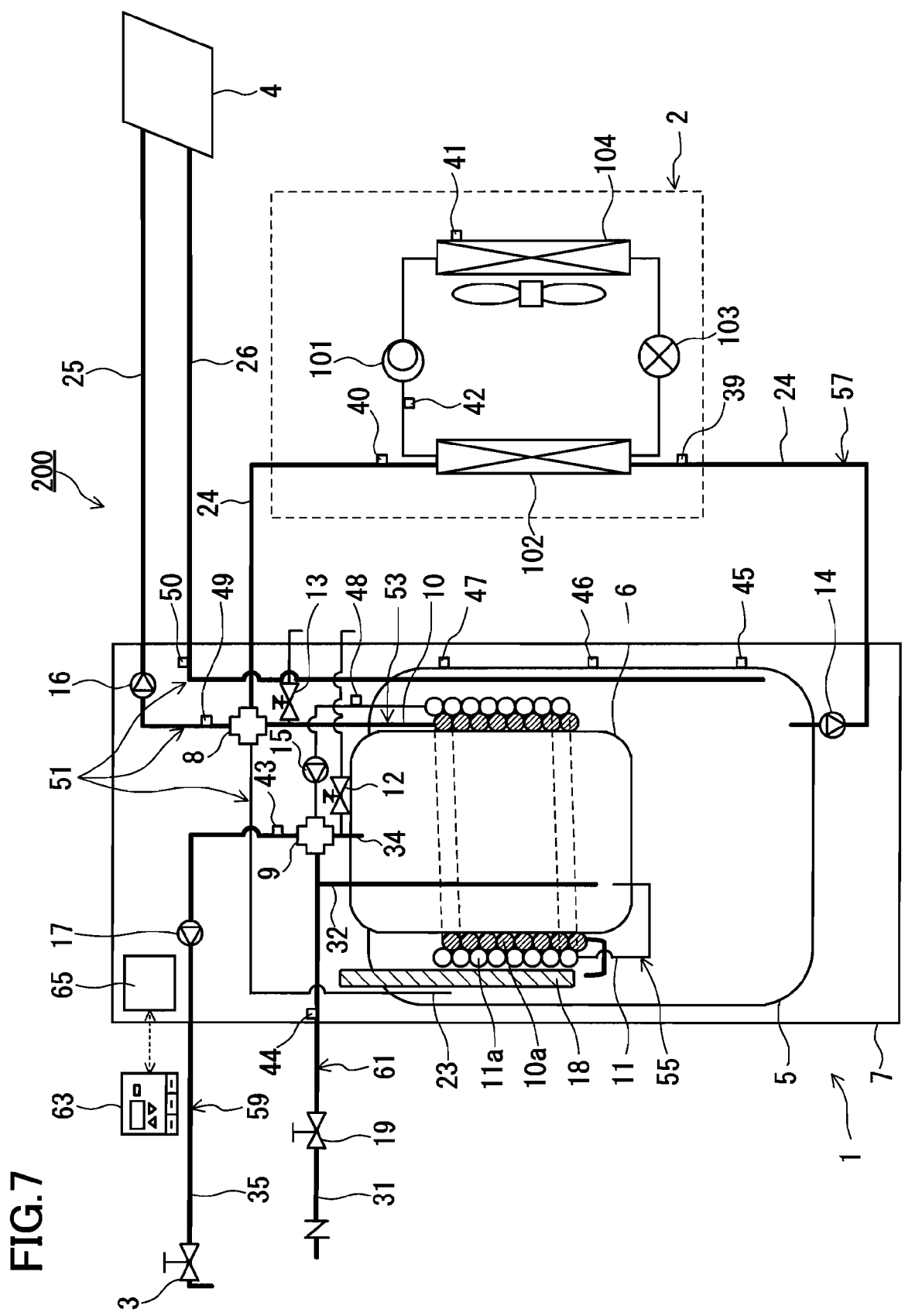
FIG. 7 is a view for describing flow routes for hot water at the time of heating and hot-water supply (at normal load).

The valve mechanisms 8 and 9 each are constituted by a distribution valve capable of switching the direction of the flow of hot water from one direction to another direction, merging a plurality of flows into one flow, and dividing one flow into a plurality of flows. Although the valve mechanisms 8 and 9 each are constituted by a four-way distribution valve capable of connecting four pipes in this embodiment, they may be constituted by combining a plurality of more common three-way distribution valves. Further, in the case where the operation mode described below with reference to FIG. 7 is not required to be performed, the valve mechanisms 8 and 9 each may be constituted by a switching valve without the distribution function.

The heater circulation path 51 functions to supply the hot water of the first tank 5 to the heater 4 and return the hot water that has flowed through the heater 4 to the first tank 5. The heater circulation path 51 is constituted by a first forward pipe 23, a second forward pipe 25, a pump 16 and a return pipe 26. The first tank 5 and the first valve mechanism 8 are connected by the first forward pipe 23 extending from the inside of the first tank 5 to the outside thereof. The inlet of the heater circulation path 51 constituted by the first forward pipe 23 is located in the space in the upper part of the first tank 5. The first valve mechanism 8 and the heater 4 are connected by the second forward pipe 25. The first forward pipe 23 constitutes a part (upstream side portion) of the forward portion of the heater circulation path 51, and the second forward pipe 25 constitutes the remainder (downstream side portion) of the forward portion of the heater circulation path 51. The pump 16 is provided on the second forward pipe 25. The heater 4 and the first tank 5 are connected by the return pipe 26 extending from the outside of the first tank 5 to the inside thereof. The outlet of the heater circulation path 51 constituted by the return pipe 26 is located in the space at the bottom of the first tank 5. The hot water stored in the space in the upper part of the first tank 5 can be supplied to the heater 4 through the first forward pipe 23, the first valve mechanism 8 and the second forward pipe 25. The hot water at a decreased temperature in the heater 4 returns to the space at the bottom of the first tank 5 through the return pipe 26.

The first path 53 functions to introduce the hot water of the first tank 5 into the second forward pipe 25 of the heater circulation path 51, taking a different route from the first forward pipe 23. Further, the first path 53 functions also to return the hot water heated by the heat pump 2 to the first tank 5. The first path 53 is constituted by a first heat transfer pipe 10. The first heat transfer pipe 10 forms a first heat transfer portion 10a surrounding the portion of the second tank 6 exposed to the inside of the first tank 5. The first tank 5 and the forward portion (the second forward pipe 25) of the heater circulation path 51 are connected by the first path 53 so that the hot water of the first tank 5 can be supplied to the heater 4 through the first heat transfer portion 10a. The position of the opening of the first path 53 inside the first tank 5 is defined in the space in the upper part of the first tank 5 between the sidewall of the first tank 5 and the sidewall of the second tank 6. The hot water stored in the space in the upper part of the first tank 5 can be supplied to the heater 4 through the first heat transfer pipe 10, the first valve mechanism 8 and the second forward pipe 25. A pressure relief valve 13 is provided at a portion on the first path 53 outside the first tank 5.

The second path 55 functions to introduce the hot water of the second tank 6 into the hot-water supply path 59 as well as to allow the hot water of the second tank 6 to circulate. The second path 55 is constituted by a second heat transfer pipe 11, a pump 15 and a pipe 34. The second heat transfer pipe 11 forms a second heat transfer portion 11a disposed along the first heat transfer portion 10a. The position of the inlet of the second path 55 constituted by the second heat transfer pipe 11 is defined in the space at the bottom of the second tank 6. The pump 15 is provided on the second heat transfer pipe 11 at a position between the second heat transfer portion 11a and the second valve mechanism 9. The second valve mechanism 9 and the second tank 6 are connected by the pipe 34 extending from the outside of the second tank 6 to the inside thereof. The position of the outlet of the second path 55 constituted by the pipe 34 is defined in the space in the upper part of the second tank 6. A pressure relief valve 12 is provided, branching from the pipe 34.

In this way, the second path 55 forms a circulation path for allowing the hot water stored in the space at the bottom of the second tank 6 to circulate in the second heat transfer portion 11a and then to return to the space in the upper part of the second tank 6. Since the hot-water supply path 59 and the second path 55 are connected via the second valve mechanism 9, it also is possible to supply, to the hot-water supply path 59, the hot water that has flowed through the second heat transfer pipe 11.

As indicated in FIG. 1, the first heat transfer portion 10a of the first path 53 and the second heat transfer portion 11a of the second path 55 are in contact with each other. Accordingly, heat exchange can be performed between the hot water flowing through the first path 53 and the hot water flowing through the second path 55 via these heat transfer portions 10a and 11a. That is, it is possible to heat the hot water flowing through the second heat transfer pipe 11 by the hot water flowing through the first heat transfer pipe 10 efficiently. Conversely, it also is possible to heat the hot water flowing through the first heat transfer pipe 10 by the hot water flowing through the second heat transfer pipe 11 efficiently. In the former case, the hot water flowing through the first heat transfer pipe 10 is heated by the heat pump 2 and returns to the first tank 5. The hot water of the second tank 6 flowing through the second heat transfer pipe 11 can be heated by the hot water at high temperature that has been heated by the heat pump 2. In the latter case, the hot water flowing through the first heat transfer pipe 10 is to be supplied directly to the heater 4 from the first tank 5. The hot water on the way to the heater 4 from the first tank 5 can be heated by the hot water of the second tank 6 at high temperature flowing through the second heat transfer pipe 11. In addition, the heat transfer pipes 10 and 11 have an effect in suppressing the heat radiation from the second tank 6.

In the example of FIG. 1, the first heat transfer pipe 10 and the second heat transfer pipe 11 each are a single pipe, and the outer diameter of the first heat transfer pipe 10 and the outer diameter of the second heat transfer pipe 11 are equal. The first heat transfer pipe 10 is wound around the second tank 6 so that the first heat transfer pipe 10 is interposed between the second tank 6 and the second heat transfer pipe 11, and the second heat transfer pipe 11 is wound further around the second tank 6 over the first heat transfer pipe 10. In other words, the second heat transfer pipe 11 is wound indirectly around the second tank 6 via the first heat transfer pipe 10.

More specifically, the first heat transfer pipe 10 is wound directly around the second tank 6 in spiral form so that the adjacent portions of the first heat transfer pipe 10) in the height direction of the second tank 6 are in close contact with each other. Further, the second heat transfer pipe 11 is wound around the second tank 6 in spiral form over the first heat transfer pipe 10 so that the first heat transfer pipe 10 and the second heat transfer pipe 11 are in contact with each other at a plurality of points in radial directions. That is, the first heat transfer pipe 10 and the second heat transfer pipe 11 each are close wound, and the portions forming the heat transfer portions 10a and 11a are double coiled. With such a configuration, it is possible to enhance the heat exchange efficiency while ensuring a sufficient heat transfer area.

The first heat transfer pipe 10 may be fixed to the second tank 6 by welding or brazing the portion forming the heat transfer portion 10a to the second tank 6. This makes it possible to reduce the heat resistance. For the same reason, the second heat transfer pipe 11 may be fixed to the first heat transfer pipe 10 by welding or brazing the portion forming the heat transfer portion 11a to the first heat transfer pipe 10.

The outer diameter of the first heat transfer pipe 10 and the outer diameter of the second heat transfer pipe 11 may be different. The positional relationship between the first heat transfer pipe 10 and the second heat transfer pipe 11 also is not specifically limited, as long as the two are in contact with each other. For example, the second heat transfer pipe 11 may be wound directly around the second tank 6 in spiral form, and the first heat transfer pipe 10 may be wound indirectly around the second tank 6 over the second heat transfer pipe 11 that has been wound around the second tank 6.

Figure 2A:
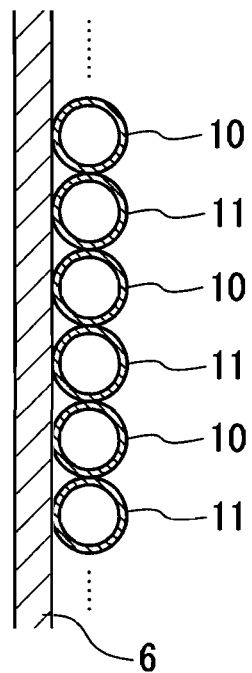
FIG. 2A is an enlarged view indicating a first heat transfer pipe and a second heat transfer pipe in another array.

Further, as indicated in FIG. 2A, the first heat transfer pipe 10 and the second heat transfer pipe 11 each may be wound directly around the second tank 6 in spiral form so that the first heat transfer pipe 10 and the second heat transfer pipe 11 are disposed alternately in the height direction of the first tank 5. Also in this way, the same effect as mentioned above can be obtained.

Figure 2B:
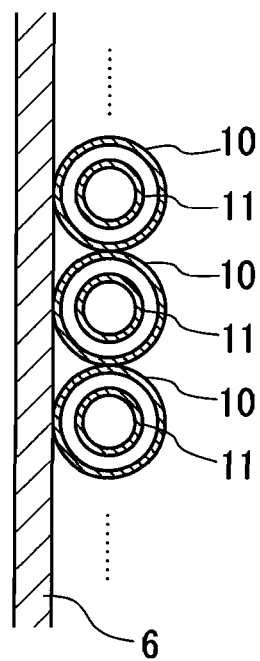
FIG. 2B is an enlarged view indicating the first heat transfer pipe and the second heat transfer pipe in still another array.

As indicated in FIG. 2B, a double pipe in which the second heat transfer pipe 11 having a smaller diameter is provided through the inside of the first heat transfer pipe 10 having a larger diameter is wound around the second tank 6 in spiral form. Also in this way, the same effect as mentioned above can be obtained. In the example of FIG. 2B, the positional relationship between the first heat transfer pipe 10 and the second heat transfer pipe 11 may be reversed between the inner and outer.

However, according to the example of FIG. 1 in which the first heat transfer pipe 10 is interposed between the second heat transfer pipe 11 and the second tank 6, the first heat transfer pipe 10 is in contact with both the second heat transfer pipe 11 and the second tank 6. Therefore, the heat exchange can be performed more efficiently than in the example in which the second heat transfer pipe 11 is disposed inside and the first heat transfer pipe 10 is disposed outside (not shown in the drawings). In the case of employing the positional relationship of FIG. 1, when heat travels from the first heat transfer pipe 10 to the second heat transfer pipe 11, the heat travels from the first heat transfer pipe 10 also to the outer wall of the second tank 6. When heat travels from the second heat transfer pipe 11 to the first heat transfer pipe 10, the heat travels also from the outer wall of the second tank 6 to the first heat transfer pipe 10. That is, it is possible to use the outer wall of the second tank 6 actively as a heat transfer surface, thereby improving the heat exchange efficiency. Further, according to the example of FIG. 1, the first heat transfer pipe 10 and the second heat transfer pipe 11 are in a close-packed array in the height direction, which is more advantageous in extending the length of each of the heat transfer portions 10a and 11a that contribute to the heat exchange than in the example of FIG. 2A. Furthermore, the example of FIG. 1 is more advantageous in cost than the example of the double pipe (FIG. 2B).

It should be noted that the heat transfer portions 10a and 11a need not be formed by the heat transfer pipes 10 and 11 as long as they are capable of allowing hot water to flow therethrough as well as allowing heat exchange to be performed efficiently therebetween. However, in view of cost and productivity, the present embodiment is preferable.

Next, the heat pump path 57 functions to introduce the hot water of the first tank 5 into the heat pump 2. The heat pump path 57 is constituted by a pipe 24 and a pump 14 provided on the pipe 24. The upstream end of the pipe 24 is connected to the first tank 5. The position of the inlet of the heat pump path 57 constituted by the pipe 24 is defined in the space at the bottom of the first tank 5. On the other hand, the downstream end of the pipe 24 is connected to the first valve mechanism 8. That is, the first path 53, the downstream end of the heat pump path 57, and the forward portion of the heater circulation path 51 are connected to one another. Thus, the hot water heated by the heat pump 2 can be supplied directly to the heater 4. According to the configuration in which the hot water heated by the heat pump 2 is supplied directly to the heater 4, the pressure loss can be suppressed to a low level and power savings for the pumps 14 and 16 can be expected. Low radiation loss also can be achieved.

Further, it also is possible to use the first path 53 as a path for returning the hot water heated by the heat pump 2 to the first tank 5. According to such a configuration, it is possible to reduce the length of the heat pump path 57 since there is no need of extending the heat pump path 57 to the inside of the first tank 5. In addition, the number of pipes passing through the first tank 5 can be prevented from increasing.

Specifically, the first valve mechanism 8 is provided at the connection point of the first path 53, the heat pump path 57 and the forward portion of the heater circulation path 51. The hot water of the first tank 5 to be supplied to the heater 4 through the first path 53 and the hot water of the first tank 5 heated by the heat pump 2 are merged in the first valve mechanism 8, which can be introduced into the heater circulation path 51 (second forward pipe 25). According to this operation mode, the heating performance of the hot water stored in the first tank 5 in advance is added to the heating performance of the heat pump 2. Therefore, this operation mode is effective when a high heating performance exceeding the heating performance of the heat pump 2 is required.

In the above-mentioned operation mode, it is possible to enhance the heat exchange between the hot water of the second tank 6 and the hot water of the first tank 5 to be supplied to the heater 4 through the first path 53 by circulating the hot water of the second tank 6 in the second path 55. Thus, the heat of the hot water of the second tank 6 can be used as an auxiliary heat source, and thus instantaneous heating performance can be further enhanced.

In the above-mentioned operation mode, it also is possible to merge, in the first valve mechanism 8, the hot water of the first tank 5 to be supplied to the heater 4 through the first forward pipe 23, the hot water of the first tank 5 to be supplied to the heater 4 through the first path 53 and the hot water of the first tank 5 heated by the heat pump 2, and then introduce the merged hot water into the second forward pipe 25 of the heater circulation path 51.

Further, an operation mode in which the hot water of the first tank 5 to be supplied to the heater 4 through the first forward pipe 23 and the hot water of the first tank 5 heated by the heat pump 2 only are merged in the first valve mechanism 8 and then introduced into the second forward pipe 25 of the heater circulation path 51 also is possible by controlling the first valve mechanism 8. That is, the first path 53 is not used therein. Also in this operation mode, the heating performance of the hot water stored in the first tank 5 in advance is added to the heating performance of the heat pump 2.

Next, the water supply path 61 functions to adjust the temperature of the hot water to be supplied to the hot-water supply path 59 as well as to supply city water to the second tank 6. The water supply path 61 has a water supply pipe 31, a branch water supply pipe 32 and a pressure reducing valve 19. An external water pipe (not shown in the drawings) and the second valve mechanism 9 are connected by the water supply pipe 31. The branch water supply pipe 32 is branched from the water supply pipe 31 and extends to the inside of the second tank 6. The position of the opening at the tip of the branch water supply pipe 32 is defined in the space at the bottom of the second tank 6. When the hot-water tap 3 is opened and the hot water of the second tank 6 is consumed, city water is supplied to the space at the bottom of the second tank 6 through the water supply pipe 31 and the branch water supply pipe 32. City water may be supplied immediately upon the consumption of the hot water of the second tank 6. It also may be supplied after the hot water is consumed to some extent, in an amount corresponding to the consumed amount or a predetermined amount. By defining the position of the opening of the pipe 34 in the space around the center of the second tank 6, it is possible to use a considerable amount of the hot water of the second tank 6 continuously without supplying city water.

The hot-water supply path 59 is constituted by a hot water outlet pipe 35 and a pump 17 provided on the hot water outlet pipe 35. The second valve mechanism 9 and the hot-water tap 3 are connected by the hot water outlet pipe 35. The hot water of the second tank 6 can be supplied to the hot-water tap 3 through the second heat transfer pipe 11 of the second path 55, the second valve mechanism 9 and the hot-water supply path 59. By stopping the pump 15 and activating the pump 17, it also is possible to supply the hot water of the second tank 6 to the hot-water tap 3 through the pipe 34. Further, by mixing the city water flowing through the water supply path 61 and the hot water of the second tank 6 in the second valve mechanism 9 at an appropriate ratio, it is possible to supply the hot water adjusted to an appropriate temperature to the hot-water tap 3. It also is possible to supply only the city water flowing through the water supply path 61 to the hot-water tap 3.

Next, the control circuit of the hot-water supply system 200 is described.

As indicated in FIG. 1, the hot-water supply system 200 is provided with various temperature sensors 39 to 50, an input terminal 63 and a controller 65. The input terminal 63 is constituted, for example, by a microcomputer, an input portion for setting the water supply temperature and the heating degree in accordance with the input operation by the user, and a monitor for displaying the use status of hot water and the heating degree. The controller 65 is constituted by a microcomputer or a DSP (digital signal processor) for executing the control program of the system. The input terminal 63 and controller 65 are communicably connected to each other. The results detected (detected signals) by the various temperature sensors 39 to 50 are sent to the controller 65. The controller 65 performs the control of the pumps 14 to 17, the first valve mechanism 8, the second valve mechanism 9, the heat pump 2 and the auxiliary heater 18 based on the results detected by the various temperature sensors 39 to 50 by a known method such as PI control so that the water supply temperature and the heating degree approach the conditions that have been set in advance through the input terminal 63.

An inlet water temperature sensor 39 is provided in the vicinity of the inlet of the heat pump path 57 into the water-refrigerant heat exchanger 102, and an outlet water temperature sensor 40 is provided in the vicinity of the outlet thereof. The difference between the inlet water temperature and the outlet water temperature of the water-refrigerant heat exchanger 102 can be calculated from the results detected by the inlet water temperature sensor 39 and the outlet water temperature sensor 40. The real-time heating performance of the heat pump 2 can be calculated from the water temperature difference and the rotation rate of the pump 14. The heat pump 2 may be controlled so that the calculated heating performance approaches the desired heating performance.

An evaporation temperature sensor 41 is provided in the evaporator 104 of the heat pump 2 and a discharge temperature sensor 42 is provided at the outlet portion of the compressor 101. The opening degree of the electric expansion valve 103 and the rotation rate of the compressor 101 are controlled based on the results detected by the evaporation temperature sensor 41 and the discharge temperature sensor 42 so that the efficiency of the heat pump 2 is maximized. Normally, the heat pump 2 is operated at or near rated performance to maximize the efficiency.

A plurality of tank temperature sensors 45, 46 and 47 are provided on the surface of the outer wall of the first tank 5 along the height direction. The tank temperature sensors 45, 46 and 47 can detect the temperature distribution of the hot water stored in the first tank 5 in the height direction, that is, the amount of the hot water (which corresponds to the amount of stored heat). It is possible to store an appropriate temperature and amount of hot water in the first tank 5 as well as maintain the hot water of the second tank 6 at the optimum temperature by controlling the operation of the heat pump 2 based on the results detected by the tank temperature sensors 45, 46 and 47. These tank temperature sensors 45, 46 and 47 may be provided on the surface of the inner wall of the first tank 5, or may be provided on the surface of the outer wall of the second tank 6 inside the first tank 5.

A city water temperature sensor 44 for detecting the temperature of city water is provided on the water supply path 61. A first water supply temperature sensor 43 for detecting the temperature of the hot water immediately before being supplied to the hot-water tap 3 is provided on the hot-water supply path 59. A second water supply temperature sensor 48 for detecting the temperature of the hot water immediately before flowing into the second valve mechanism 9 through the second heat transfer pipe 11 is provided on the second path 55. Based on the results detected by the water supply temperature sensors 43 and 48, the second valve mechanism 9 is controlled so that the mixing ratio of the hot water of the second tank 6 and city water is adjusted. A first heating temperature sensor 49 for detecting the temperature of the hot water to be supplied to the heater 4 is provided on the second forward pipe 25 of the heater circulation path 51. A second heating temperature sensor 50 for detecting the temperature of the hot water to be returned from the heater 4 to the first tank 5 is provided on the return pipe 26 of the heater circulation path 51. The results detected by the heating temperature sensors 49 and 50 can be used as data for determining the degree of heating load together with the pre-set heating degree.

Next, several operation modes of the hot-water supply system 200 are described. However, these operation modes are no more than an example, and the present invention is not limited thereto in any way. In each operation mode, the actuators of the first valve mechanism 8 and the second valve mechanism 9 are controlled by the controller 65 so that the flow indicated in each drawing is formed.

Hot-Water Supply

Figure 3:
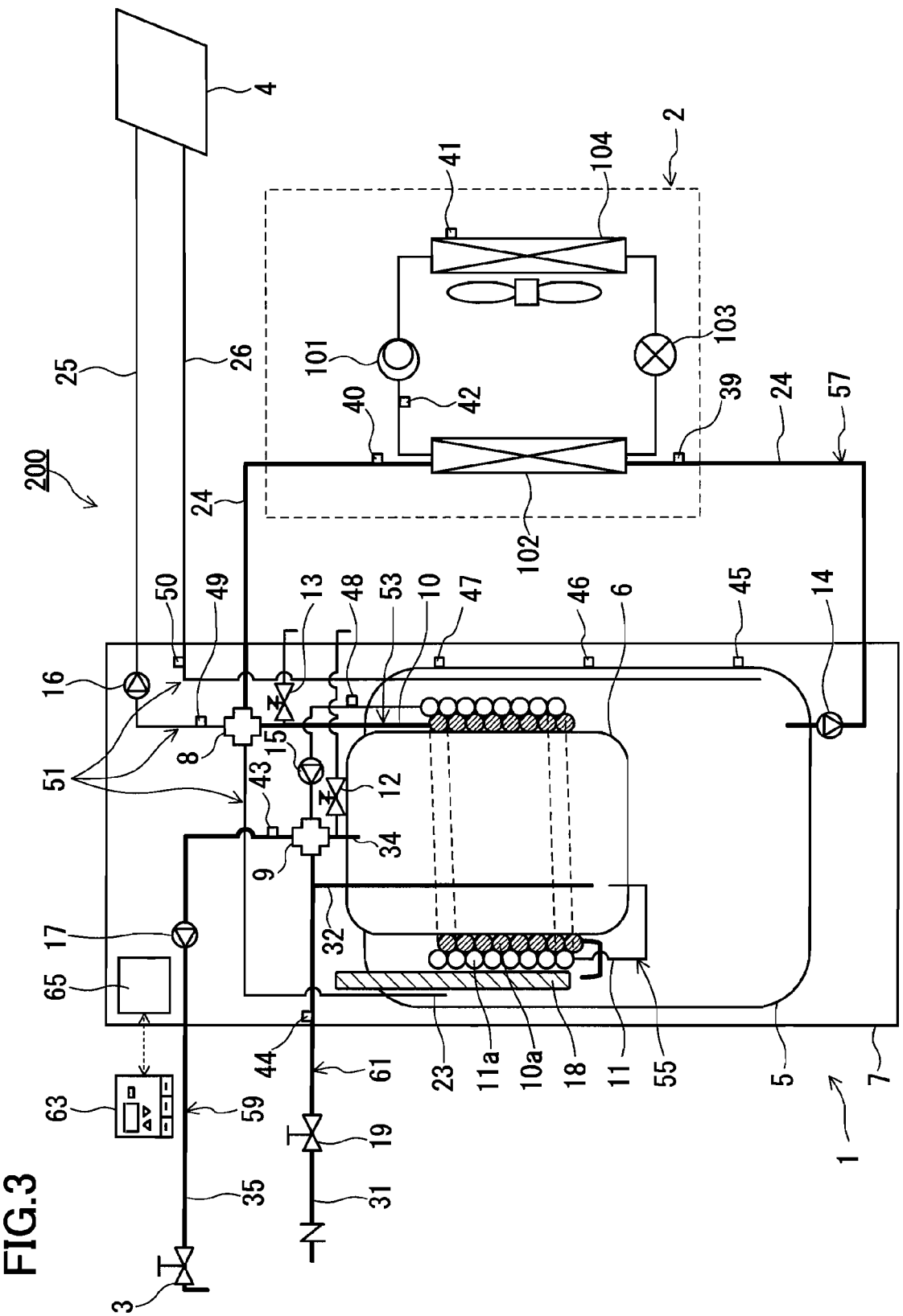
FIG. 3 is a view for describing flow routes for hot water at the time of heating water.

The operation mode indicated in FIG. 3 can be performed when the hot-water supply load is within the range of the heating performance of the heat pump 2. In the drawing, the thick lines indicate the flow of hot water (or city water). The heater 4 is turned off. Upon opening of the hot-water tap 3, the hot water of the second tank 6 is supplied to the hot-water tap 3 through the pipe 34 of the second path 55, the second valve mechanism 9 and the hot-water supply path 59. The hot water of the second tank 6 is mixed with the city water flowing through the water supply path 61 in the second valve mechanism 9, so as to be adjusted to the temperature set in advance through the input terminal 63. City water in the same amount as the used hot water is supplied to the space at the bottom of the second tank 6 through the branch water supply pipe 32. In this regard, the hot water of the second tank 6 may be supplied to the hot-water tap 3 through the second heat transfer pipe 11 instead of the pipe 34, or may be supplied thereto through both of the pipe 34 and the second heat transfer pipe 11. The water temperature may be monitored by the water supply temperature sensors 43 and 48 and controlled so that the hot water is supplied through the optimal path.

When city water is supplied to the second tank 6, the heat pump 2 is started and heats the hot water of the first tank 5. The hot water heated by the heat pump 2 is returned to the space in the upper part of the first tank 5 through the first path 53. Thus, the hot water of the second tank 6 is heated indirectly. When the hot-water tap 3 is closed, the operation mode shifts to the hot water storage mode described below with reference to FIG. 4. It should be noted that, in the case where the hot water of the second tank 6 is consumed in a large amount, there is a possibility that the hot-water supply load by itself exceeds the heating performance of the heat pump 2. In such a case, the operation may be performed in a high load hot-water supply mode in which the auxiliary heater 18 is used to compensate for the lack of the heating performance.

Hot Water Storage

Figure 4:
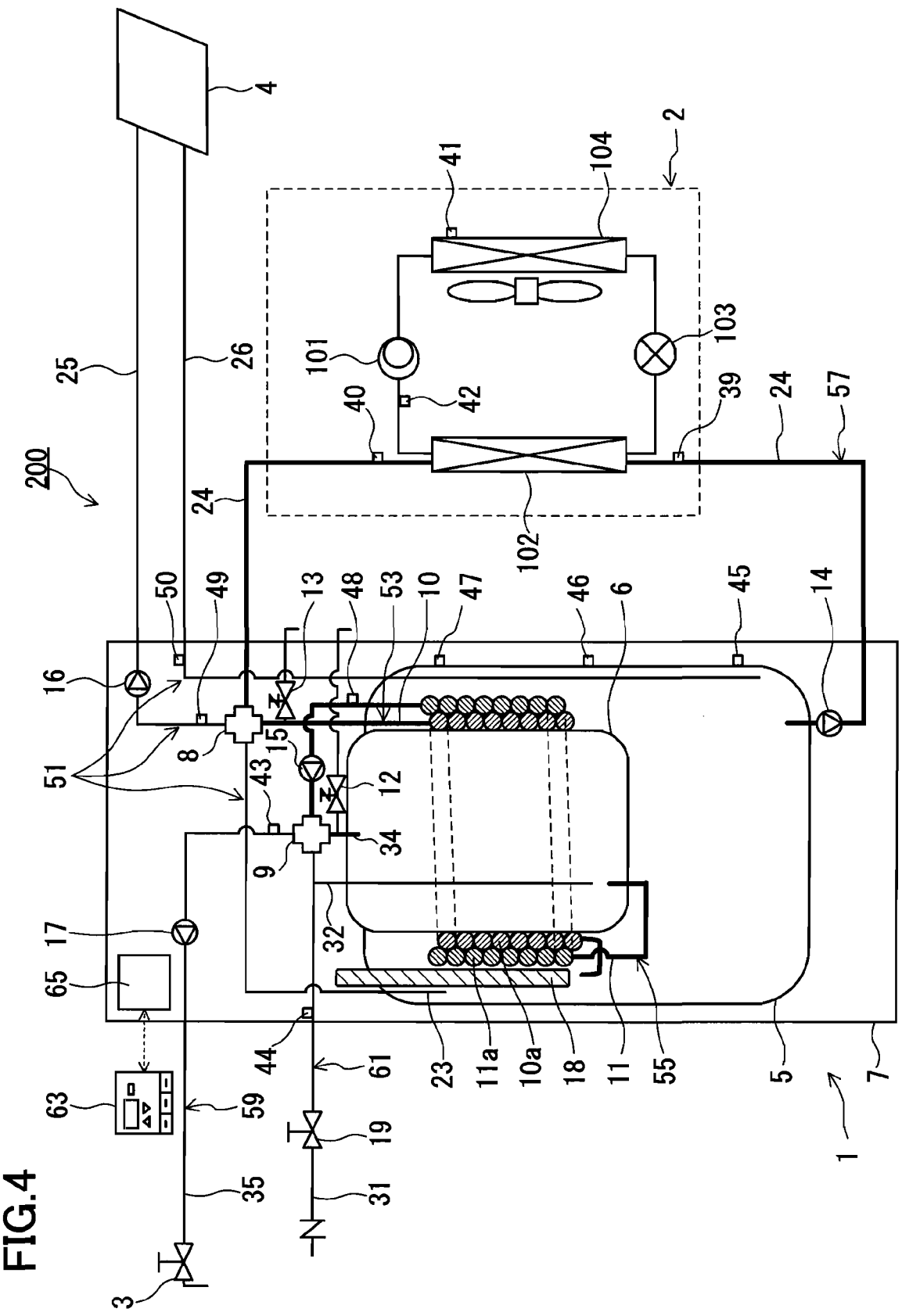
FIG. 4 is a view for describing flow routes for hot water at the time of storing water.

FIG. 4 indicates a hot water storage mode in which the heat pump 2 is activated for heating the hot water of the first tank 5. The hot water of the second tank 6 is heated indirectly by the heating of the hot water of the first tank 5. The hot water storage mode can be performed when the hot-water tap 3 is closed. For example, the amount of the hot water (the amount of stored heat) of the first tank 5 and/or the second tank 6 is estimated based on the results detected by the tank temperature sensors 45, 46 and 47 provided on the surface of the outer wall of the first tank 5, and if the estimated amount of the hot water falls below a predetermined value, the heat pump 2 is started and the heating of the hot water of the first tank 5 is started. As indicated in FIG. 4, while the hot water heated by the heat pump 2 is returned to the first tank 5 through the first path 53, the hot water of the second tank 6 is circulated in the second path 55. Heat exchange in the heat transfer portions 10a and 11a is performed between the hot water flowing through the second path 55 and the hot water heated by the heat pump 2, so that the hot water of the second tank 6 is heated rapidly to an appropriate temperature.

Figure 11:
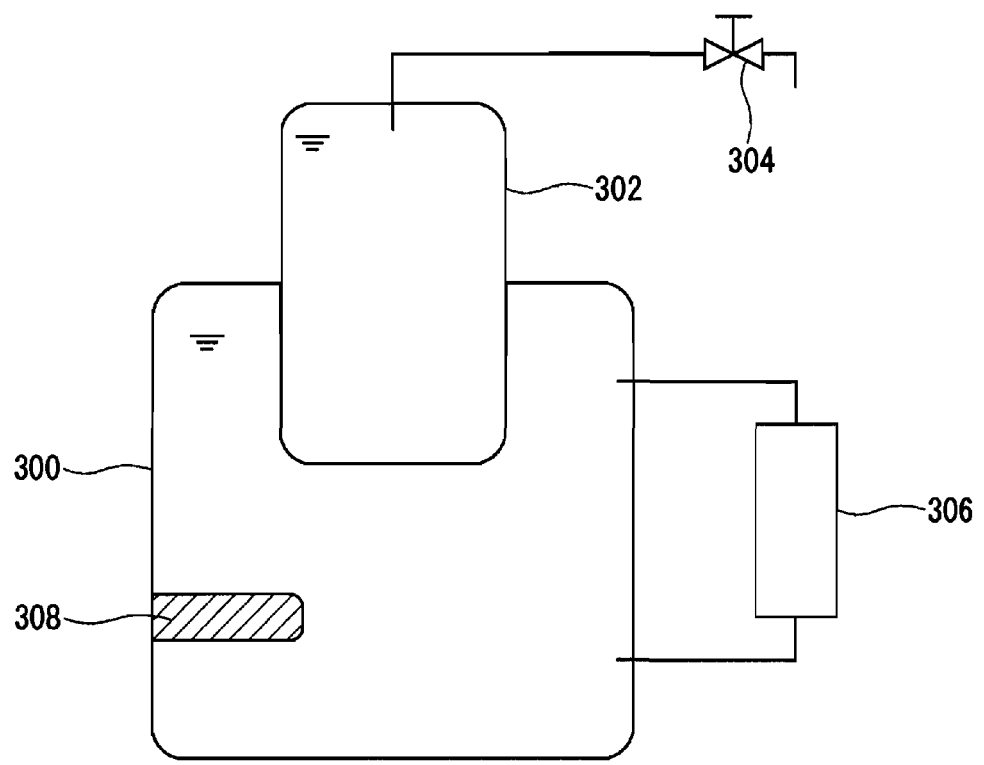
FIG. 11 is a simple schematic diagram indicating a conventional hot-water supply system.

In the conventional system indicated in FIG. 11, when the hot water of the second tank 302 is consumed in a large amount, city water is supplied to the second tank 302 and the temperature of the hot water of the second tank 302 decreases, it takes a long time to heat the hot water of the second tank 302 to an appropriate temperature again. That is, in the case where the hot water is consumed in a large amount in a short time, it is hard to avoid the possibility of running out of hot water. The problem of taking a long time for raising the temperature of the hot water of the second tank 302 is caused not only by the problem of the heating performance of the heat pump or the heater, but also by the essence of the hot-water supply system in which a double tank structure is employed, that is, the hot water of the second tank 302 is heated indirectly by the hot water of the first tank 300.

In contrast, according to the hot-water supply system 200 in this embodiment, the hot water heated by the heat pump 2 is returned to the first tank 5 through the first path 53. At this time, the hot water of the second tank 6 is circulated in the second path 55, and thus heat exchange in the heat transfer portions 10a and 11a occurs between the hot water flowing through the first path 53 and the hot water flowing through the second path 55. The heat exchange using forced convection is performed, thereby making it possible to raise the temperature of the hot water of the second tank 6 in a shorter time than in the conventional system (FIG. 11). Further, the second heat transfer portion 11a where the hot water of the second tank 6 flows is immersed in the hot water stored in the space in the upper part of the first tank 5. This also contributes to the rapid temperature rise of the hot water of the second tank 6.

Heating (At Normal Load)

Figure 5:
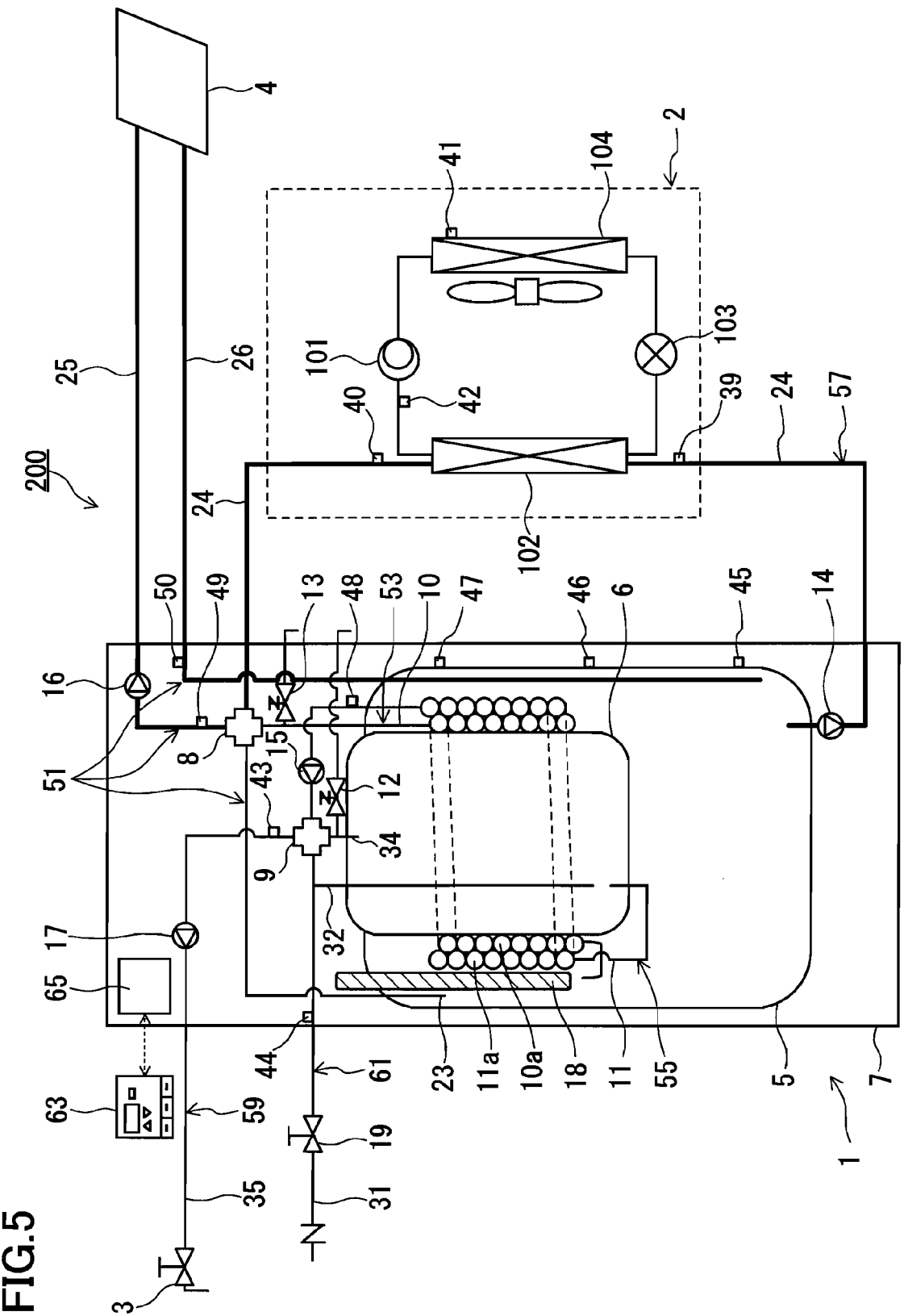
FIG. 5 is a view for describing a flow route for hot water at the time of heating.

FIG. 5 indicates a normal heating mode that can be performed when the amount of the hot water of the second tank 6 (the amount of stored heat) is sufficient, and the heating load is within the range of the heating performance of the heat pump 2 (for example, within the range of 70% to 130% of the rated performance). In this normal heating mode, the hot water heated by the heat pump 2 alone is used for heating. The opening degree of the electric expansion valve 102 in the heat pump 2 and the rotation rate of the compressor 101 are controlled so that the heating performance of the heat pump 2 matches the desired heating performance.

The hot water of the first tank 5 heated by the heat pump 2 is supplied to the heater 4 through the first valve mechanism 8 and the second forward pipe 25 of the heater circulation path 51. The hot water that has been circulated in the heater 4 is returned to the space at the bottom of the first tank 5 through the return pipe 26 of the heater circulation path 51. It is possible to supply hot water at higher temperature to the heater 4 by directly supplying the hot water heated by the heat pump 2 to the heater 4 without returning it to the first tank 5. In addition, it also is possible to reduce the load of the pumps 14 and 16.

In the case where the outdoor temperature is low, frost forms in the evaporator 104 of the heat pump 2, which causes the necessity of a defrosting process at a pre-set timing. During the defrosting process, the heat pump 2 cannot heat hot water. Accordingly, during the defrosting process, the hot water stored in the first tank 5 may be supplied to the heater 4, as described below with reference to FIG. 6. In this way, a continuous heating effect can be achieved and thus the user comfort can be improved.

Heating (At Low Load)

Figure 6:
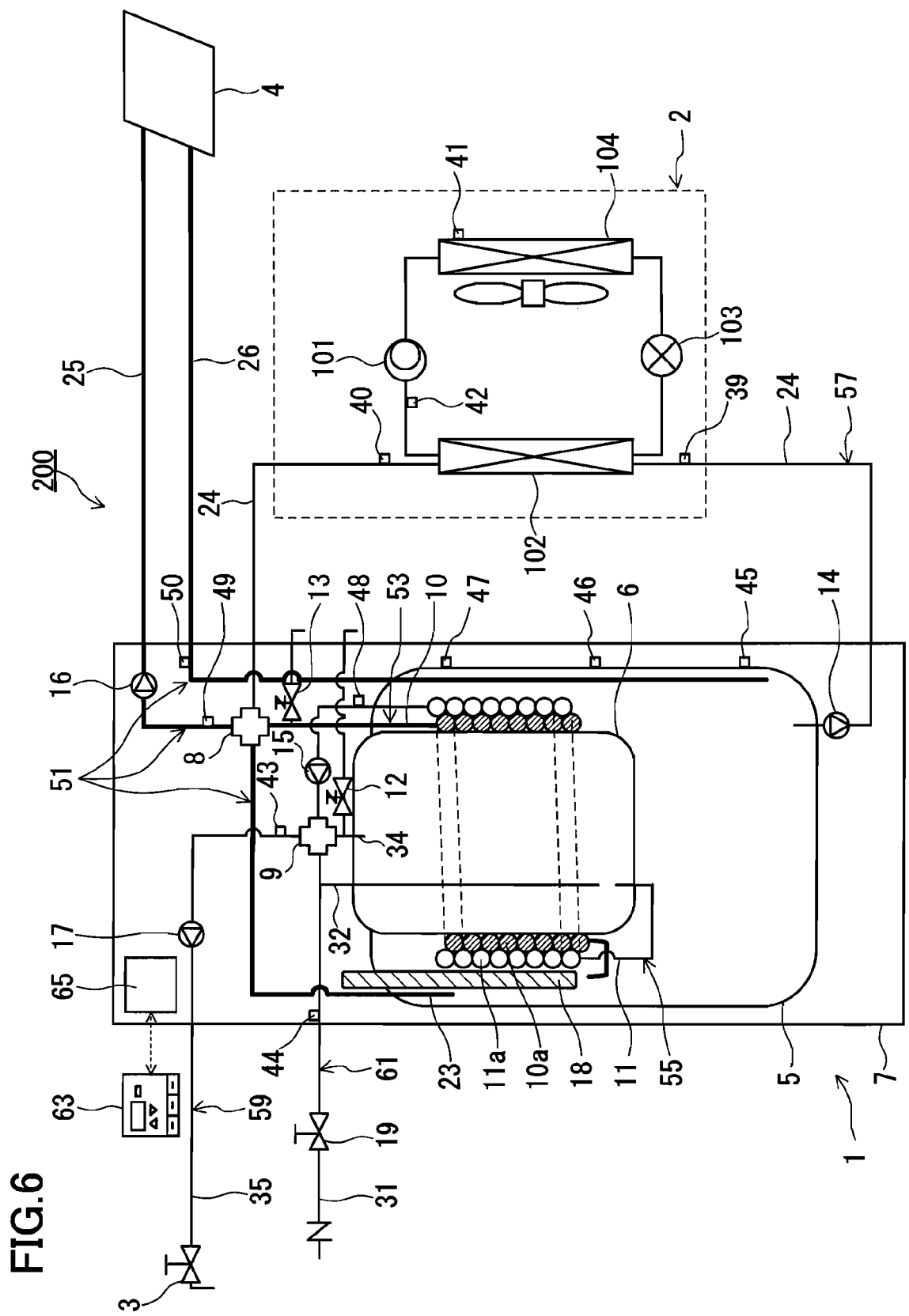
FIG. 6 is a view for describing flow routes for hot water at the time of heating (at low load).

FIG. 6 indicates a low load heating mode that can be performed when the amount of the hot water of the first tank 5 (the amount of stored heat) is sufficient, and the heating load is very low. Specifically, the low load heating mode can be performed when the heating load falls below a predetermined ratio (e.g. 70%) of the rated performance of the heat pump 2. Further, it may be performed during the defrosting process of the heat pump 2.

If the normal heating mode indicated in FIG. 5 is selected when the heating load is very low, the heat pump 2 is required to be operated at a performance far from the rated performance. The operation at a performance far from the rated performance is not efficient for the heat pump 2. Accordingly, in the case of a sufficiently low heating load, it is preferable that the heat pump 2 be stopped and the hot water stored in the first tank 5 be used for heating.

The hot water of the first tank 5 is introduced into the second forward pipe 25 through at least one of the first forward pipe 23 and the first heat transfer pipe 10 (first path 53). There is a difference between the position of the opening of the first forward pipe 23 and the position of the opening of the first heat transfer pipe 10 in the height direction inside the first tank 5. Accordingly, when a fine adjustment of the temperature of the hot water to be supplied to the heater 4 is required, the hot water of the first tank 5 to be introduced into the second forward pipe 25 through the first forward pipe 23 and the hot water of the first tank 5 to be introduced into the second forward pipe 25 through the first heat transfer pipe 10 may be mixed in the first valve mechanism 8 at a predetermined ratio. Thus, the hot water adjusted to an appropriate temperature can be supplied to the heater 4.

Specifically, in this embodiment, the positional relationship between the opening of the first forward pipe 23 and the opening of the first heat transfer pipe 10 (first path 53) is defined as follows. That is, the first path 53 is open into the space in the upper part of the first tank 5 at a position lower than the opening of the first forward pipe 23. Since thermal stratification is formed inside the first tank 5, there is a temperature difference between the hot water of the first tank 5 drawn from the first forward pipe 23 and the hot water of the first tank 5 drawn from the first heat transfer pipe 10 constituting the first path 53. Accordingly, it is possible to select whether to draw the hot water of the first tank 5 only from the first forward pipe 23, to draw the hot water of the first tank 5 only from the first heat transfer pipe 10 (first path 53), or to draw the hot water of the first tank 5 from both of the first forward pipe 23 and the first heat transfer pipe 10 followed by mixing in the first valve mechanism 8, depending on the degree of heating load. In other words, it is possible to supply hot water at an appropriate temperature to the heater 4.

In the case where the amount of the hot water of the first tank 5 (amount of stored heat) falls below a predetermined value, the operation may be started at or near the rated performance of the heat pump 2 to heat the hot water of the first tank 5. At this time, as described below with reference to FIG. 7, the hot water heated by the heat pump 2 is distributed by the first valve mechanism 8, so that the distributed hot water can be supplied to the heater 4. Further, a configuration in which the heat pump 2 is started when the temperature of the hot water returned from the heater 4 to the first tank 5 falls below a predetermined value also is possible.

Alternatively, the hot-water supply to the heater 4 may be stopped temporarily. Thereafter, when the amount of the hot water of the first tank 5 (amount of stored heat) becomes sufficient, the operation of the heat pump 2 is stopped and the hot water stored in the first tank 5 is used again for heating. Such ON-OFF control enables the heat pump 2 to be operated at rated performance for a longer time. As a result, the energy consumption efficiency is more improved than in the case of dealing with the variation of the heating load by controlling the rotation rate of the compressor 101 using an inverter.

Heating+Hot-Water Supply (At Normal Load)

FIG. 7 indicates a normal load mode that can be performed when the amount of the hot water of the second tank 6 (amount of stored heat) is insufficient, and the total of the heating load and the hot-water supply load is near the rated performance of the heat pump 2 (for example, within the range of 70% to 130% of the rated performance). In short, the normal load mode is a combination of the hot-water supply mode of FIG. 3 and the heating mode of FIG. 6. Hot water is supplied to the hot-water tap 3 as already described with reference to FIG. 3.

The hot water heated by the heat pump 2 is distributed into a fraction to be supplied directly to the heater 4 and a fraction to be returned to the first tank 5 through the first path 53 in the first valve mechanism 8. Thus, the hot water of the second tank 6 can be heated actively while the heater 4 is activated. The distribution ratio may be determined depending, for example, on the desired heating performance. In the case where the hot-water tap 3 is closed, as already described with reference to FIG. 4, the hot water of the second tank 6 may be circulated in the second path 55. This allows heat exchange in the heat transfer portions 10a and 11a between the hot water flowing through the first path 53 and the hot water flowing through the second path 55 to occur, so that the hot water of the second tank 6 raises its temperature rapidly.

As already described with reference to FIG. 4, FIG. 5 and FIG. 7, the hot-water supply system 200 of this embodiment further allows the operation in at least one mode selected from a mode in which the entire amount of the hot water heated by the heat pump 2 is returned to the first tank 5 through the first path 53 (FIG. 4), a mode in which the entire amount of the hot water heated by the heat pump 2 alone is supplied directly to the heater 4 (FIG. 5), and a mode in which, while a part of the hot water heated by the heat pump 2 is supplied directly to the heater 4, the remainder is returned to the first tank 5 through the first path 53 (FIG. 7). The advantages of each mode already have been described with reference to each drawing. The selection of each mode can be performed by an appropriate control of the valve mechanisms 8 and 9 through the controller 65.

Heating (At High Load)

Figure 8:
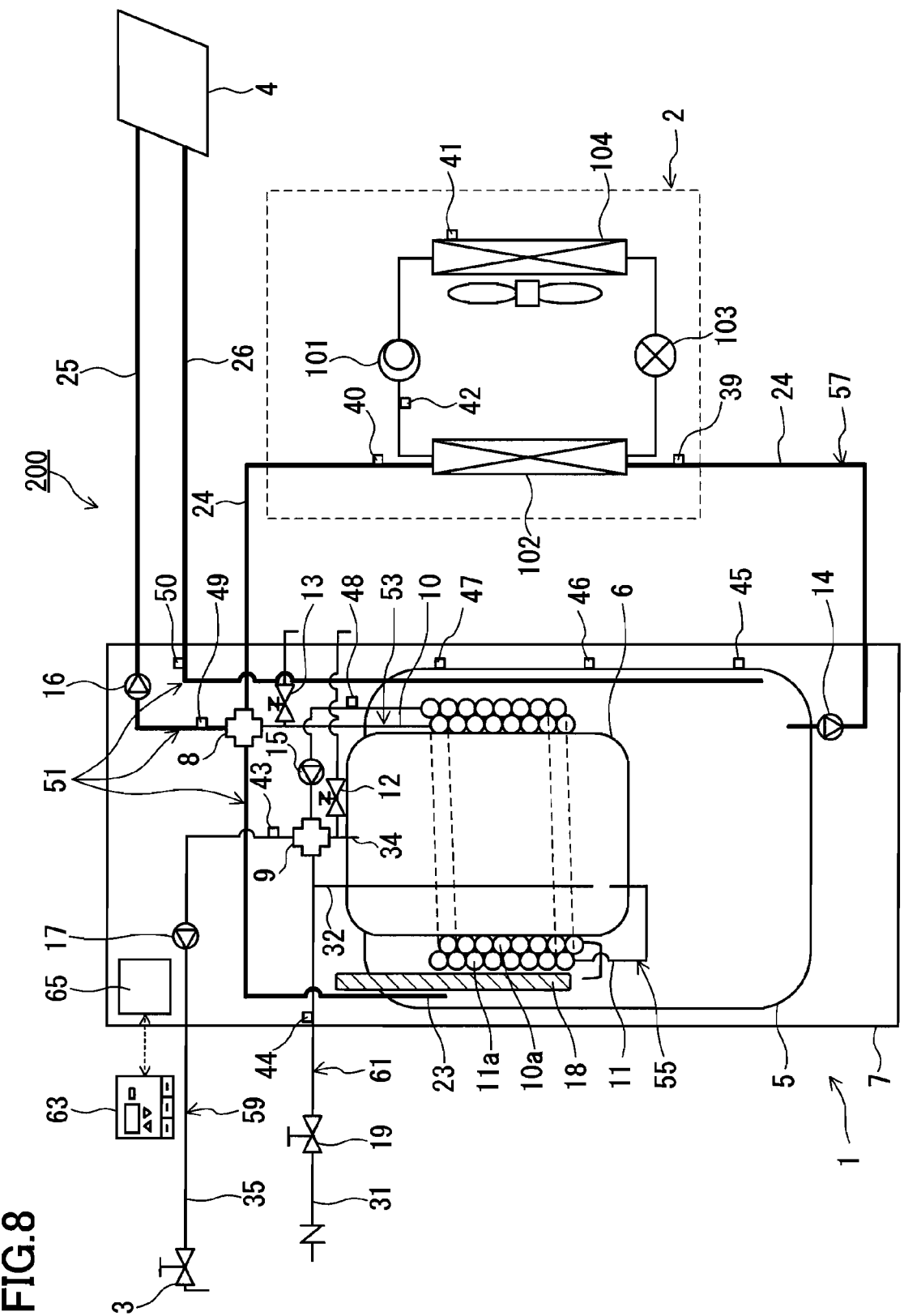
FIG. 8 is a view for describing flow routes for hot water at the time of heating (at high load).

FIG. 8 indicates a high load heating mode that can be performed when the heating load exceeds the maximum heating performance of the heat pump 2 (for example, over 130% of the rated performance). The hot water of the first tank 5 to be supplied to the heater 4 through the first forward pipe 23 is mixed with the hot water of the first tank 5 heated by the heat pump 2 at an appropriate ratio in the first valve mechanism 8, which is introduced into the second forward pipe 25 of the heater circulation path 51. In this way, the heating performance by the hot water of the first tank 5 is added to the maximum heating performance of the heat pump 2. Therefore, a heating performance exceeding the maximum heating performance of the heat pump 2 temporarily can be achieved.

Here, the hot water of the first tank 5 may be introduced into the second forward pipe 25 through the first path 53 instead of the first forward pipe 23. Further, the hot-water supply mode described with reference to FIG. 3 can be performed in parallel with this high load heating mode, and thus the hot water of the second tank 6 can be supplied to the hot-water tap 3.

Heating (At Rapid Load)

Figure 9:
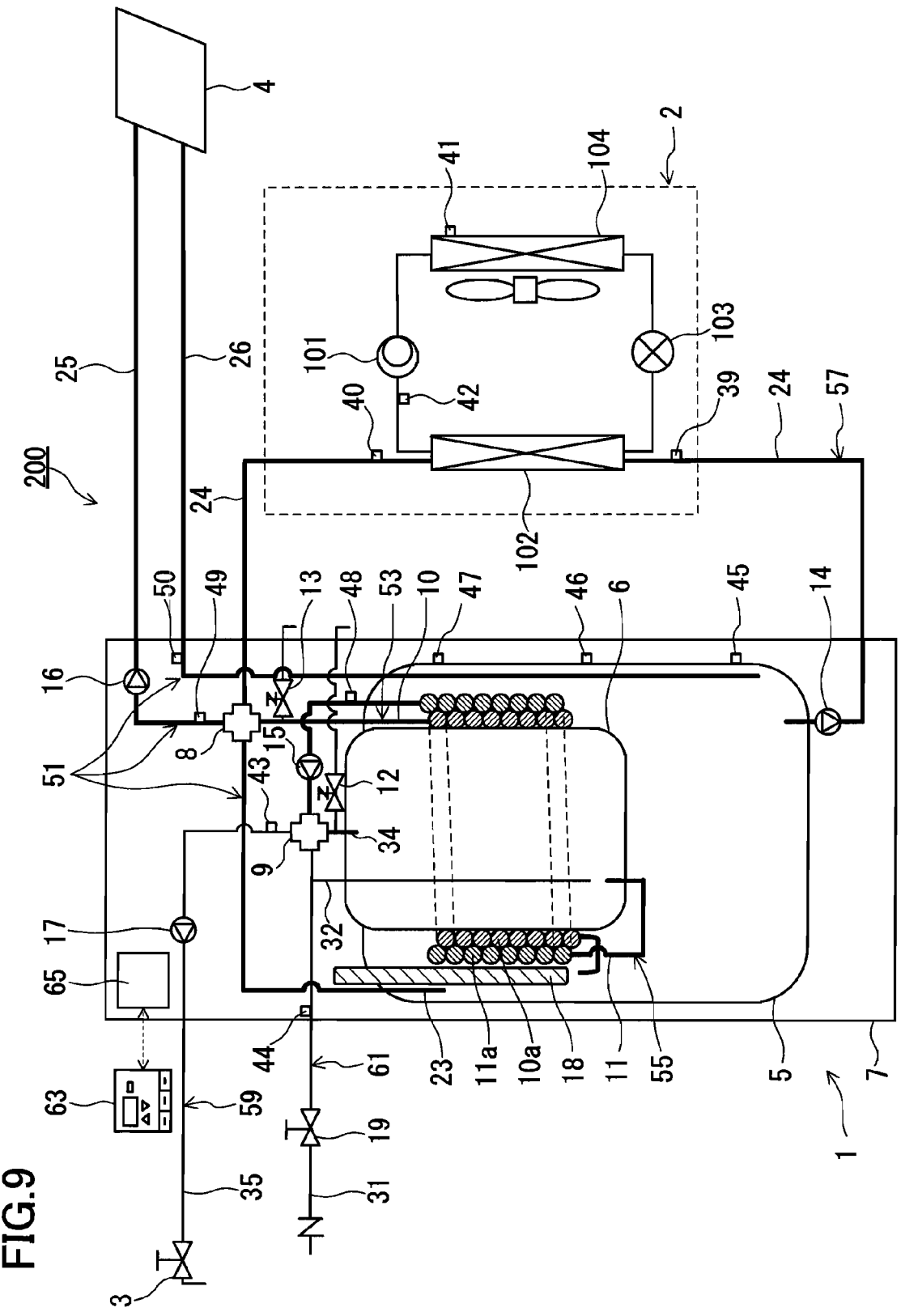
FIG. 9 is a view for describing flow routes for hot water at the time of heating (at rapid load).

FIG. 9 indicates a rapid heating mode that can be performed when the heating load exceeds the maximum heating performance of the heat pump 2 (for example, over 130% of the rated performance) and in a time period in which rapid heating is required, such as in the morning and evening. The hot water of the first tank 5 to be supplied to the heater 4 through the first forward pipe 23 and the first path 53 (first heat transfer pipe 10) is mixed with the hot water of the first tank 5 heated by the heat pump 2 at an appropriate ratio in the first valve mechanism 8, which is introduced into the second forward pipe 25 of the heater circulation path 51. Concurrently with this, the hot water of the second tank 6 is circulated in the second path 55.

Then, heat exchange between the hot water of the first tank 5 flowing through the first path 53 and the hot water of the second tank 6 flowing through the second path 55 occurs in the heat transfer portions 10a and 11a. That is, auxiliary heating of the hot water of the first tank 5 to be supplied to the heater 4 can be performed using the hot water of the second tank 6. The heating performance by the hot water of the first tank 5 and the heating performance by the hot water of the second tank 6 are added to the maximum heating performance of the heat pump 2. Therefore, a heating performance significantly exceeding the maximum heating performance of the heat pump 2 temporarily can be achieved. It should be noted that the hot water of the first tank 5 may be supplied to the heater 4 using the first path 53 (first heat transfer pipe 10) and the heat pump path 57 without using the first forward pipe 23 (not shown in the drawings).

Also in the rapid heating mode described with reference to FIG. 9, the hot water of the second tank 6 can be supplied to the hot-water tap 3. Specifically, the hot water of the second tank 6 that has been introduced into the second valve mechanism 9 through the second heat transfer pipe 11 can be introduced into the hot-water supply path 59.

Others

In the case where the operation in the high load heating mode described above with reference to FIG. 8 is continued past the pre-set time period, the auxiliary heater 18 of a resistance heating type may be employed for heating the hot water of the first tank 5. Similarly, in the case where the operation in the rapid heating mode described above with reference to FIG. 9 is continued past the pre-set time period, the auxiliary heater 18 may be employed for heating the hot water of the first tank 5.

In this embodiment, the position of the auxiliary heater 18 inside the first tank 5 is defined in the space in the upper part of the first tank 5 between the sidewall of the first tank 5 and the sidewall of the second tank 6. The first forward pipe 23 and the first heat transfer pipe 10 constituting the first path 53 are open into the periphery of the auxiliary heater 18. The opening of the first forward pipe 23 is located between the upper end and the lower end of the auxiliary heater 18 in the height direction. The opening of the first heat transfer pipe 10 is located below the auxiliary heater 18 and faces the auxiliary heater 18. Such a positional relationship can increase the convection in the periphery of the auxiliary heater 18 when the hot water of the first tank 5 is drawn from the first forward pipe 23 and/or the first heat transfer pipe 10, thus enhancing the heat transfer coefficient. As a result, the maximum heating performance of the hot-water supply system 200 is still further enhanced because, while the heat efficiency in the auxiliary heater 18 is enhanced, the hot water of the first tank 5 can be drawn from the first forward pipe 23 and/or the first heat transfer pipe 10.

In the operation modes described above with reference to FIG. 8 and FIG. 9, the amount of the load exceeds the maximum heating performance of the heat pump 2. Accordingly, the hot water of the first tank 5 and the hot water of the second tank 6 may be heated sufficiently during the time period in which the total of the hot-water supply load and the heating load falls within the heating performance of the heat pump 2 (preferably, within the rated performance) so that these operation modes can be selected and performed appropriately. Such time period may be a time period from midnight to early morning (e.g. 2:00 AM to 6:00 AM), or may be a time period estimated by the controller 65. For example, the controller 65 may execute a program for estimating a time period in which the total of the hot-water supply load and the heating load falls within the heating performance of the heat pump 2 (preferably, within the rated performance) based on the operational history for a certain period (for example, the previous several days).

Further, the amount of the load can be determined based on data, such as the results detected by the various temperature sensors, the season conditions, the time period, the set temperature of heating, and the set temperature of hot-water supply. Furthermore, by referring to the database pre-stored in the memory of the controller 65 using at least one selected from these data groups as a retrieval key, one or a plurality of operation modes may be selected from various operation modes to be performed.

For example, in the case where a result detected by the second heating temperature sensor 50 provided on the return pipe 26 of the heater circulation path 51 satisfies a predetermined condition (falling below the predetermined value) during the operation in the normal heating mode, the operation mode can shift to the high load heating mode. Further, for example, in the case where a result detected by the second water supply temperature sensor 48 provided on the second heat transfer pipe 11 satisfies a predetermined condition (falling below the predetermined value), the heat pump 2 can be started to perform the hot water storage mode described above with reference to FIG. 3 and FIG. 4. In the case where the heat pump 2 already has been in operation and the hot water heated by the heat pump 2 is supplied directly to the heater 4, a part of the hot water heated by the heat pump 2 can be distributed by the first valve mechanism 8 to be supplied to the first path 53, so that the temperature rise of the hot water of the second tank 6 can be enhanced (normal load mode of FIG. 7). When the heating operation is stopped, it is possible to return the entire amount of the hot water heated by the heat pump 2 to the first tank 5 through the first path 53 (hot water storage mode of FIG. 4).

Modified Embodiments

Figure 10:
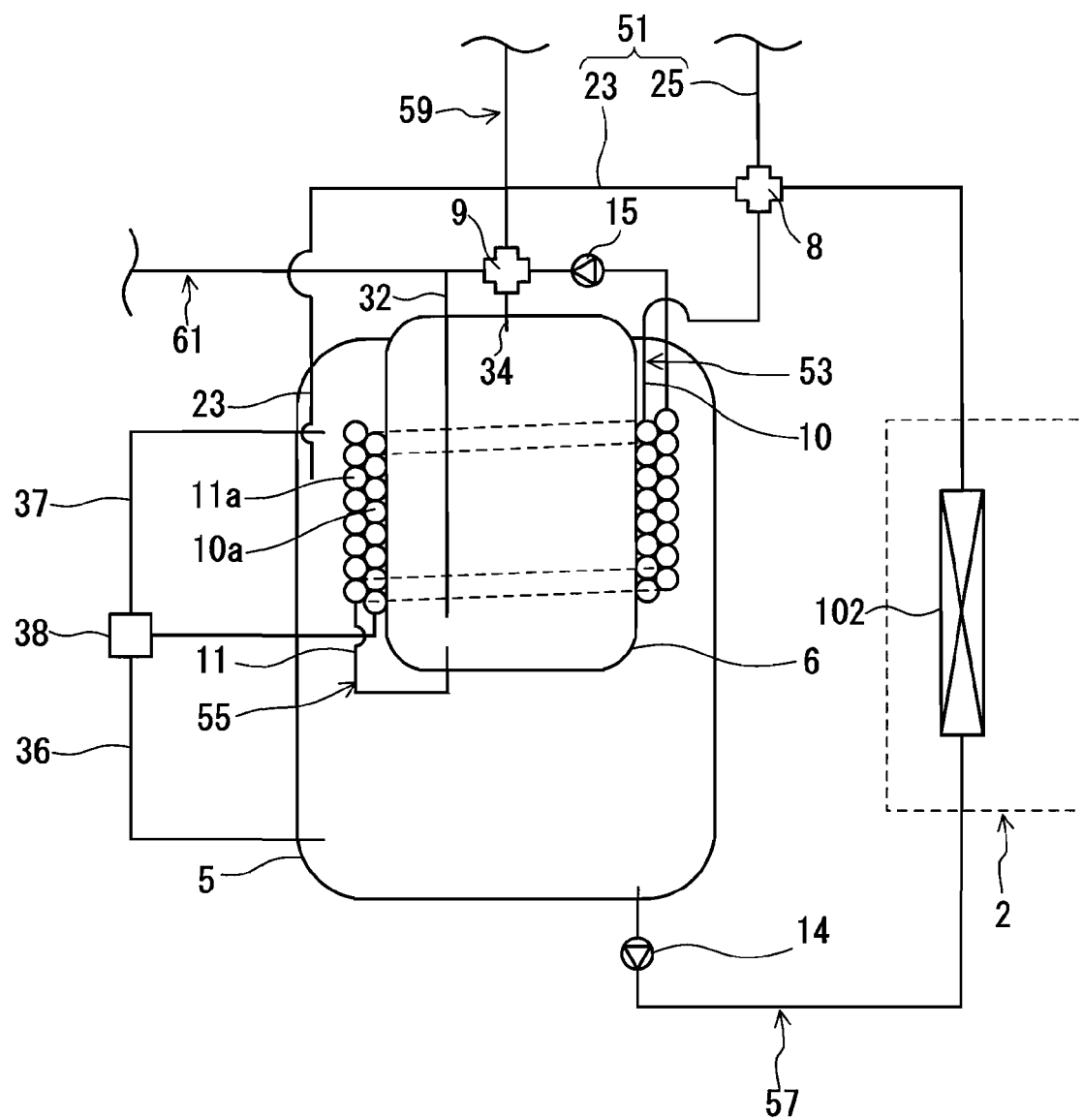
FIG. 10 is a simple schematic diagram indicating a hot-water supply system of a modified embodiment.

As indicated in FIG. 10, the first path 53 further may have a third valve mechanism 38 to which the end of the first heat transfer pipe 10 on the opposite side to the side connected to the first valve mechanism 8 is connected, a lower pipe 36 for introducing the hot water stored in the space at the bottom of the first tank 5 into the first heat transfer pipe 10, and an upper pipe 37 for introducing the hot water stored in the space in the upper part of the first tank 5 into the first heat transfer pipe 10. The position of the opening of the upper pipe 37 in the first tank 5 may be about the same as that of the opening of the first forward pipe 23 of the heater circulation path 51 in height. The third valve mechanism 38 may be a three-way distribution valve, or may be a switching valve having a single function to switch the flow direction.

With such a configuration, either one of the hot water at high temperature stored in the space in the upper part of the first tank 5 and the hot water at low temperature stored in the space at the bottom of the first tank 5 can be introduced into the heater circulation path 51 through the first path 53. Further, in the case of the valve mechanism 38 being a distribution valve, it is possible to introduce the hot water at the desired temperature into the heater circulation path 51 through the first heat transfer pipe 10 by mixing the hot water at high temperature and the hot water at low temperature at a desired ratio.

Further, it also is possible to return the hot water heated by the heat pump 2 to the space in the upper part of the first tank 5, or to return it to the space at the bottom thereof. For example, in the case where the amount of the hot water of the second tank 6 (amount of stored heat) is sufficient and the heat pump 2 is activated in order to heat the hot water of the first tank 5 for heating, the hot water heated by the heat pump 2 may be returned to the space in the upper part of the first tank 5. On the other hand, the hot water at a decreased temperature resulting from the heat exchange with the hot water of the second tank 6 in the hot water storage mode (see FIG. 4) may be returned to the space at the bottom of the first tank 5. In this way, it is possible to keep the temperature gradient inside the first tank 5 as steep as possible. Low water temperature around the bottom of the first tank 5 increases the efficiency of the heat exchange in the water-refrigerant heat exchanger 102, thereby enhancing the coefficient of performance of the heat pump 2, which is preferable.

Further, the first tank 5 may be provided with a water filler and a water outlet. This makes it possible to adjust the amount of water in the first tank 5. In this case, during the time period when the heater 4 is not in use (e.g. in summer), the water level of the first tank 5 can be lowered to a predetermined height (for example, below the bottom surface of the second tank 6) in order to suppress radiation loss from the second tank 6. Moreover, in order to enable the adjustment of the amount of water in the first tank 5, a buffer tank may be provided that temporarily saves the water of the first tank 5. For example, a three-way valve may be provided on the heat pump path 57, to which the buffer tank then is connected. In the case of lowering the water level of the first tank 5, heating of the hot water of the second tank 6 may be performed by circulating, in the first path 53, the hot water stored in the space at the bottom of the first tank 5, or may be performed by a dedicated auxiliary heater provided inside the second tank 6.

The invention claimed is:

1. A hot-water supply system comprising:
a first tank for storing hot water for heating;
a second tank for storing hot water to be supplied to a hot-water tap, the second tank being accommodated in or mounted to the first tank such that at least a part of the second tank is exposed to the inside of the first tank;
a heater circulation path for supplying the hot water of the first tank to a heater and returning the hot water from the heater to the first tank;
a first path including a first heat transfer portion surrounding the part of the second tank exposed to the inside of the first tank, the first path connecting the first tank to the heater circulation path so that the hot water of the first tank can be supplied to the heater through the first heat transfer portion; and
a second path including a second heat transfer portion disposed along the first heat transfer portion, an inlet of the second path, and an outlet of the second path, wherein
each of the inlet and the outlet of the second path is positioned in the second tank,
the second heat transfer portion of the second path is disposed outside the second tank, and
the second path is configured to form a circulation path in which the hot water stored in the second tank is allowed to flow out of the second tank through the inlet of the second path, to flow into the second heat transfer portion, to exchange heat with the hot water in the first heat transfer portion at the second heat transfer portion, to be directed toward the outlet of the second path from the second heat transfer portion, and to flow into the second tank from the outlet of the second path.

2. The hot-water supply system according to claim 1, wherein
the first heat transfer portion is formed by a first heat transfer pipe constituting the first path,
the second heat transfer portion is formed by a second heat transfer pipe constituting the second path,
the first heat transfer pipe is wound around the second tank, and the second heat transfer pipe is wound around the second tank over the first heat transfer pipe so that the first heat transfer pipe is interposed between the second tank and the second heat transfer pipe.

3. The hot-water supply system according to claim 2, wherein
the outer diameter of the first heat transfer pipe and the outer diameter of the second heat transfer pipe are equal,
the first heat transfer pipe is wound around the second tank in spiral form such that adjacent portions of the first heat transfer pipe in the height direction of the second tank are in close contact with each other, and
the second heat transfer pipe is wound around the second tank in spiral form over the first heat transfer pipe so that the first heat transfer pipe and the second heat transfer pipe are in contact with each other at a plurality of points in radial directions.

4. The hot-water supply system according to claim 1, wherein
the first heat transfer portion is formed by a first heat transfer pipe constituting the first path,
the second heat transfer portion is formed by a second heat transfer pipe constituting the second path, and
the first heat transfer pipe and the second heat transfer pipe each are wound directly around the second tank in spiral form so that the first heat transfer pipe and the second heat transfer pipe are alternately disposed in the height direction of the second tank.

5. The hot-water supply system according to claim 1, further comprising:
a heat pump serving as a means for heating the hot water of the first tank; and
a heat pump path for introducing the hot water of the first tank into the heat pump, wherein
the first path, the heat pump path, and the heater circulation path are connected to one another so that the hot water heated by the heat pump can be supplied directly to the heater.

6. The hot-water supply system according to claim 5, wherein
the first path is available as a path for returning the hot water heated by the heat pump to the first tank.

7. The hot-water supply system according to claim 5, further comprising:
a valve mechanism provided at a connect point of the first path, the heat pump path and the heater circulation path, wherein
the hot-water supply system can be operated in a mode in which the hot water of the first tank to be supplied to the heater through the first path and the hot water of the first tank heated by the heat pump are merged in the valve mechanism and then introduced into the heater circulation path.

8. The hot-water supply system according to claim 7, wherein
the heat exchange between the hot water of the second tank and the hot water of the first tank to be supplied to the heater through the first path is enhanced by circulating the hot water of the second tank through the second path.

9. The hot-water supply system according to claim 7, wherein
the heater circulation path includes: a first forward pipe connecting the first tank to the valve mechanism; and a second forward pipe connecting the valve mechanism to the heater, and
when the hot-water supply system is operated in the mode, the hot water of the first tank to be supplied to the heater through the first forward pipe, the hot water of the first tank to be supplied to the heater through the first path, and the hot water of the first tank heated by the heat pump are merged in the valve mechanism and then introduced into the second forward pipe of the heater circulation path.

10. The hot-water supply system according to claim 7, wherein
the hot-water supply system can be operated by controlling the valve mechanism in at least one mode selected from: a mode in which the entire amount of the hot water heated by the heat pump alone is supplied directly to the heater; a mode in which, while a part of the hot water heated by the heat pump is supplied directly to the heater, the remainder is returned to the first tank through the first path; and a mode in which the entire amount of the hot water heated by the heat pump is returned to the first tank through the first path.

11. The hot-water supply system according to claim 7, wherein
the heater circulation path includes: a first forward pipe connecting the first tank to the valve mechanism; and a second forward pipe connecting the valve mechanism to the heater, and
the hot-water supply system can be operated by controlling the valve mechanism in a mode in which the hot water of the first tank to be supplied to the heater through the first forward pipe and the hot water of the first tank heated by the heat pump are merged in the valve mechanism and then introduced into the second forward pipe of the heater circulation path without using the first path.

12. The hot-water supply system according to claim 1, wherein
the second tank is mounted to the first tank with its upper part projecting from the first tank and the remainder being exposed to the inside of the first tank,
the heater circulation path includes a forward pipe opening into a space formed between the sidewall of the first tank and the sidewall of the second tank in an upper part of the first tank, and
the first path has an end that opens into the space in the upper part of the first tank at a position lower than the opening of the forward pipe.

13. The hot-water supply system according to claim 12, further comprising:
an auxiliary heater disposed inside the first tank, wherein
the position of the auxiliary heater is defined in the space formed between the sidewall of the first tank and the sidewall of the second tank in the upper part of the first tank.

* * * * *